United States Patent
Moine

(10) Patent No.: US 8,651,418 B2
(45) Date of Patent: Feb. 18, 2014

(54) NOSE GEAR OF AN AIRCRAFT COMPRISING A SINGLE CONTROL DEVICE FOR RETRACTION AND STEERING

(75) Inventor: Daniel Moine, Savigny sur Orge (FR)

(73) Assignee: Messier-Bugatti-Dowty, Velizy-Villacoublay (FR)

( * ) Notice: Subject to any disclaimer, the term of this patent is extended or adjusted under 35 U.S.C. 154(b) by 23 days.

(21) Appl. No.: 13/383,874

(22) PCT Filed: Jun. 23, 2010

(86) PCT No.: PCT/EP2010/058950
§ 371 (c)(1),
(2), (4) Date: Jan. 13, 2012

(87) PCT Pub. No.: WO2011/006746
PCT Pub. Date: Jan. 20, 2011

(65) Prior Publication Data
US 2012/0112000 A1    May 10, 2012

(30) Foreign Application Priority Data
Jul. 15, 2009    (FR) ..................... 09 03451

(51) Int. Cl.
 *B64C 25/50*    (2006.01)
 *B64C 25/10*    (2006.01)
(52) U.S. Cl.
 USPC ............................ 244/102 R; 244/50
(58) Field of Classification Search
 USPC ......... 244/102 R, 102 A, 102 SL, 102 SS, 50
 See application file for complete search history.

(56) References Cited

U.S. PATENT DOCUMENTS

| | | | |
|---|---|---|---|
| 2,371,699 A | 3/1945 | Martin | |
| 2,535,167 A * | 12/1950 | Smith et al. | ............ 244/50 |
| 2006/0049309 A1 | 3/2006 | Hershberger et al. | |

FOREIGN PATENT DOCUMENTS

| DE | 941 109 | 4/1956 |
|---|---|---|
| EP | 1 632 431 | 3/2006 |
| FR | 1 473 951 | 3/1967 |

OTHER PUBLICATIONS

International Search Report Issued Mar., 17, 2011 in PCT/EP10/58950 Filed Jun. 23, 2010.

* cited by examiner

*Primary Examiner* — Tien Dinh
*Assistant Examiner* — Richard R Green
(74) *Attorney, Agent, or Firm* — Oblon, Spivak, McClelland, Maier & Neustadt, L.L.P.

(57) ABSTRACT

A landing gear of an aircraft, including a strut including two arms forming a rotational axis for retracting the gear, a rotating tube mounted in a mobile manner such that it rotates inside the strut about a pivoting axis, a sliding rod that is mobile in a translatory manner in the rotating tube along the pivoting axis, and carries wheels of the gear at one of its ends, and at least one bearing point that is located on one of the elements of the gear at a distance from the retraction axis and can bear necessary efforts for the retraction, the bearing point being located on the rotating tube.

7 Claims, 1 Drawing Sheet

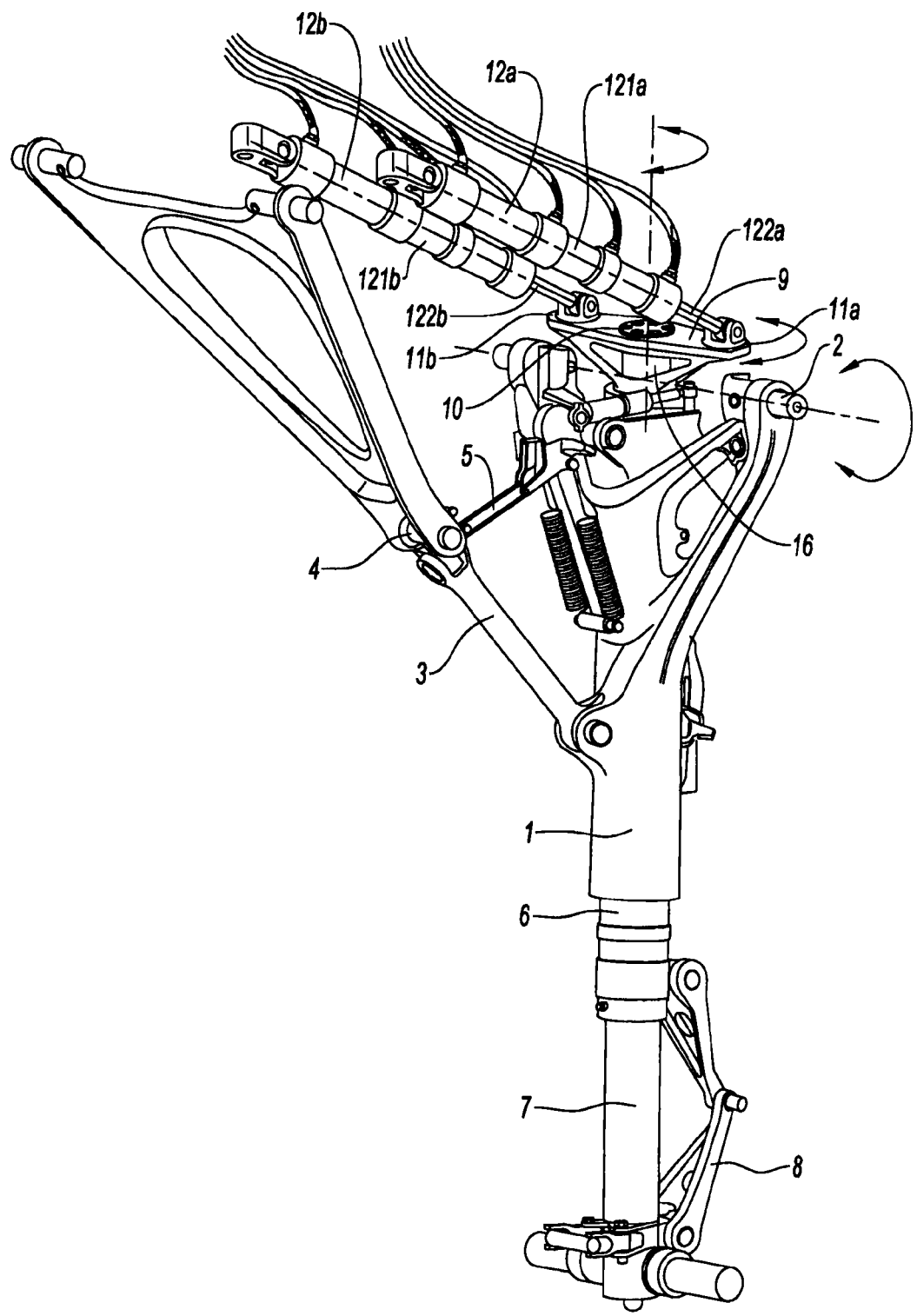

NOSE GEAR OF AN AIRCRAFT COMPRISING A SINGLE CONTROL DEVICE FOR RETRACTION AND STEERING

BACKGROUND

The field of the present invention is that of aircraft landing gears and more particularly that of systems for controlling the front landing gear thereof, in terms of retraction and in terms of steering.

Aircraft, particularly passenger airplanes, having a landing gear generally made up of a main landing gear consisting of two sets of wheels each situated under one of the wings of the airplane or under the fuselage, and of a nose landing gear situated near the front end of the fuselage. This nose gear, in addition to supporting the weight of the airplane, has a function of steering when the airplane is on the ground taxiing. It is also retractable, like the main landing gear, so that it can be housed in the fuselage after takeoff thus avoiding aerodynamic friction forces, known as drag, which, when exerted on it, would increase the fuel consumption.

This landing gear is, in the conventional way, actuated by two actuating cylinder systems one of which has the function of retracting the landing gear into the fuselage after takeoff and the other of which has the function of steering the landing gear by rotating its wheels in one direction or the other about the vertical axis of the landing gear so as to steer the airplane when it is on the ground taxiing.

With reference to FIG. 1, a nose landing gear conventionally comprises a structural component or leg 1 which ends at its upper part in arms which form a pivot 2 about which the gear is retracted. The pivot 2 is mounted on a structural component of the airplane cell so as to bear the weight of the nose landing gear when the airplane is in flight and transmit the weight of the nose section of the airplane to the landing gear when the airplane is on the ground. This pivot allows the leg 1 to be retracted as the landing gear is raised, under the action of the retraction actuating cylinder or cylinders 12a and 12b. The leg is connected to the structure of the airplane, firstly by the retraction pivot 2, and secondly by a leg bracing strut, known as the main leg bracing strut 3, which has an articulation 4 to allow it to fold as the landing gear is raised. This main leg bracing strut has the function of preventing unwanted folding of the landing gear when external forces are applied to the landing gear, for example when the wheels impact with the ground upon landing. A secondary leg bracing strut 5 deploys when the landing gear comes down and prevents the main leg bracing strut 3 from folding. It can itself be folded so that it can be retracted under the action of an actuating cylinder that is operated when the landing gear is raised, and thus allow the main leg bracing strut 3 to fold and the leg 1 to be raised up into the fuselage.

The leg 1 conventionally takes the form of a hollow cylinder in which a rotary tube 6 is placed. The rotary tube is held longitudinally in place in the leg by means known to the person skilled in the art and is capable of rotating to allow the steering instruction given by the pilot to be applied during taxiing. When the landing gear is retracted after takeoff, the rotary tube is first of all returned, by a system which may be internal or external to the leg, to a rest position which corresponds to the wheels of the nose gear lying along the axis of the airplane. In general, a mechanical system incorporated into the landing gear confirms the alignment of the wheel upon takeoff and therefore also while the shock absorber is extending.

The rotary tube is itself hollow and allows a sliding rod 7 to move within it, which sliding rod projects toward the bottom of the rotary tube and carries the axle for the nose gear wheels. The sliding rod 7 is fixed to the rotary tube by a shock absorber so as to move inside the leg according to the vertical forces applied to the wheels and so as to return to a central position which, at rest, corresponds to equilibrium between the weight borne by the nose gear and the reaction force of said spring. The sliding rod 7 and the rotary tube 6 are connected by a collection of components known as a torque link 8 which transmits to the sliding rod the orientation given to the rotary tube and therefore provides the steering command for the wheels of the airplane. The torque link assembly 8 is made up of two articulated link rods; a first link rod is attached, at one of its ends, to a horizontal pivot connected to the rod and at the other end to one of the ends of the second link rod; the other end of the second link rod is attached to a horizontal pivot connected to the rotary tube 6. The common ends of the two link rods are fixed to one another about a common horizontal pivot.

Because of the shock absorber installed inside the rotary tube, the sliding rod 7 is capable of absorbing any shocks applied to the wheels, by moving vertically.

As the sliding rod 7 moves the torque link assembly 8 deforms, remaining in a plane that is radial to the leg, and thus forces the wheels to remain in a fixed direction in relation to the rotary tube 6. The wheels are thus steered by instructing the rotary tube 6 to turn.

Numerous systems have been devized for controlling the nose gear of an aircraft, whether in terms of retracting it into a well provided for this purpose in the aircraft fuselage, or for steering when taxiing on the ground. As indicated previously, they generally consist of two actuating cylinder systems, one of which acts on the leg 1 of the nose gear in order to retract it after take off and deploy it prior to landing and the other of which acts on the rotary tube 6, in order to steer the wheels.

The actuating cylinder or cylinders concerned with retraction are fixed to the structure of the aircraft and work either in tension or, and for preference, in compression, on a fulcrum which may be situated on the leg either above or below the retraction pivot 2, depending on the geometric configuration adopted. The steering actuating cylinders, of which for preference there are two, act on the rotary tube at a point generally situated below the leg 1.

Nose gear steering systems that allow the rotary tube 6 to be pivoted so that the wheel effects a quarter of a turn and fits more easily into the fuselage when the landing gear is retracted are also known (patent applications FR 1473951 and DE 941109). The devices which generate this rotation are generally attached to fulcrums positioned on the rotary tube in the upper part of the landing gear but are engineered only to be able to pivot the rotary tube, equipped with the sliding part and with the wheels, in the leg. They are not able to withstand the forces applied to the leg when the landing gear is being retracted.

The configurations described hereinabove have the disadvantage that a number of nose gear equipments (steering actuating cylinders, supply lines and points of attachment for these actuating cylinders) are situated in a low position on the landing gear and are therefore placed outside the fuselage when the landing gear is down. These equipments are therefore positioned in the wind surrounding the airplane, and this generates aerodynamic noise and drag which is detrimental to fuel consumption. It is important, given the changes to the regulations, to reduce as far as possible the causes of noise generation and there is also a constant drive toward reducing as far as possible the overall drag of the airplane. To do so it is preferable for the equipments that control the nose gear to be positioned as high up as possible inside the fuselage. That means reducing the number and/or the volume and/or the mass of these equipments.

BRIEF SUMMARY

It is an object of the present invention to address these disadvantages by proposing a nose landing gear for an aircraft that does not have at least some of the disadvantages of the prior art and that, in particular, makes it possible to reduce the number and mass of the equipments necessary to retracting this gear and steering it.

To this end, one subject of the invention is an aircraft landing gear comprising a leg comprising two arms forming a pivot for retracting the landing gear, a rotary tube mounted so that it can turn inside said leg about a pivot axis and a sliding rod capable of translational movement inside said rotary tube along said pivot axis and bearing at one of its ends the wheel or wheels of said landing gear, said landing gear further comprising at least one fulcrum positioned on one of the elements of said landing gear distant from the retracting pivot and able to withstand the forces necessary for retracting the landing gear, characterized in that said fulcrum is positioned on the rotary tube.

By positioning the retraction fulcrum on the rotary tube and engineering it to be able to withstand the forces generated during retraction, it is possible to group together the means that retract and that steer the nose gear and thus reduce their volume and their mass. It then becomes possible more easily to position them in the upper part of the landing gear well and to avoid undesirable aerodynamic noises.

Advantageously the fulcrum for retracting the leg coincides with the fulcrum for a means for turning the rotary tube about its pivot axis.

The fact that there is just one single fulcrum means that just one single means can be used for retracting/lowering the landing gear and for steering it, thus reducing the volume of the corresponding means and making them easy to position inside the fuselage.

The generation of undesirable aerodynamic noises is thus avoided.

For preference, said fulcrum consists of a lateral extension of the upper end of the rotary tube, which is offset with respect to the axis about which the rotary tube pivots in the leg.

In one particular embodiment, said fulcrum consists of a lateral extension of the upper end of the rotary tube, situated on the opposite side of the retraction pivot to said wheel(s) when the landing gear is in the gear down position.

In another particular embodiment, the upper end of the rotary tube comprises two lateral extensions positioned one on each side of the pivot axis of the rotary tube.

Advantageously, said lateral extensions form a tee fixed to the upper end of said rotary tube by fasteners.

The invention also relates to an aircraft comprising a nose gear as described hereinabove.

BRIEF DESCRIPTION OF THE DRAWINGS

The invention will be better understood and further objects, details, features and advantages thereof will become more clearly apparent during the course of the detailed explanatory description which follows, of one embodiment of the invention given by way of purely illustrative and nonlimiting example with reference to the attached schematic drawing.

In this drawing:

FIG. 1 is a general arrangement of an airplane nose gear according to one embodiment of the invention.

DETAILED DESCRIPTION

Reference is made to FIG. 1 which shows a nose gear made up of a leg 1 borne by two arms that form the retraction pivot 2 and of a main leg bracing strut 3 locked in the deployed position by a secondary leg bracing strut 5. The leg contains a rotary tube 6 from which there extends a sliding rod 7, the bottom of the sliding rod being connected to the leg 1 by the torque link 8.

In the invention as depicted, the rotary tube 6 passes through the leg 1 over its entire length and projects from the top 16 thereof. Fixed to this upper part, by fasteners of the bolt type 10, is a retraction tee 9. This tee extends above the retraction pivot 2 and its two lateral extensions 11a and 11b are aligned with the axis of the wheels of the nose gear. The lateral extensions, by remaining, in use, always parallel to the axis of the wheels, act as fulcrums for means for turning the rotary tube, allowing the nose gear to be steered when on the ground taxiing.

Attached to these ends 11a and 11b, using an attachment that has 2 degrees of freedom in rotation, are two actuating cylinders 12a and 12b which, according to the invention, are used both for retracting and for steering the nose gear. A first degree of freedom corresponds to a rotation about an axis parallel to the retraction pivot 2 and the second corresponds to a rotation about an axis parallel to the pivot axis.

These actuating cylinders are attached at one end to the ends 11a and 11b of the retraction tee 9 and at the other end to the structure of the aircraft, likewise using an attachment that has 2 degrees of freedom in rotation. These attachments conventionally allow the actuating cylinders to exert their force while at the same time accompanying changes in alignment dictated by the movement of the leg as the landing gear is retracted or lowered.

The actuating cylinders depicted are double-acting hydraulic cylinders, namely actuating cylinders each of which comprises two devices acting in series on the deployment of the actuating cylinder rod.

Each actuating cylinder 12a, 12b comprises two chambers in which pressures are applied and which act in series on two moving elements. A first chamber actuates a first rod 121a, 121b which itself carries a second chamber which actuates a second rod 122a, 122b. Pressurized-fluid supply and return means are associated with these chambers, in the conventional way.

Each of these devices has its own system for controlling the extension demanded of the rod. A first device, associated with the first chambers and with the first rods, acts on the lowering or raising of the leg 1 by shortening or lengthening the first rods 121a, 121b of the two actuating cylinders; the first two devices act simultaneously on the two actuating cylinders, with the same amplitude, so that the tee 9 remains perpendicular to the longitudinal axis of the airplane and forces the landing gear down or up. To control the orientation of the nose gear, the second devices act on the elongations of the second rods 122a, 122b of the actuating cylinders, in opposite directions but with equal amplitudes. This function is activated only when the gear is down, i.e. when the first device has already positioned the leg 1 in a vertical position.

The invention has been illustrated in FIG. 1 with hydraulic actuating cylinders that have two pressure chambers situated one behind the other in the body of the actuating cylinder, but it could just as easily be achieved using an actuating cylinder with a single pressure chamber, or with an electric cylinder. In this case, the length to be given to the elongation of the rod for each actuating cylinder is defined, by an appropriate control system, as being the algebraic sum of the elongations desired for retracting/lowering the leg and for the orientation to be given to the tee 9.

It is also illustrated with two actuating cylinders, each one attached to one of the lateral extensions 11a and 11b, but it would be conceivable to use just one actuating cylinder, attached to a lateral extension, the second actuating cylinder being replaced by devices for blocking the second lateral extension of the tee: a blocking means in rotation about the pivot axis of the rotary tube as the gear is raised/lowered and a blocking means in rotation about its retraction pivot 2 when taxiing along the ground. The control for the single actuating cylinder and for applying the blocking will be adapted accordingly by the person skilled in the art to take account of the envisioned form of action on the nose gear.

The process of lowering the nose gear, followed by taxiing along the ground after landing, will now be described.

When the pilot decides to lower the landing gear ready for landing, he sends an identical command to the two actuating cylinders 12a and 12b to cause the two first rods 121a and 121b to retract symmetrically into the first body of their actuating cylinder. The ends of the two actuating cylinders in turn act symmetrically on the two lateral extensions 11a and 11b of the tee 9, and this causes the rotary tube 6 to turn and therefore causes the leg 1 to be lowered, by rotation about the retraction pivot 2. Once the gear is down, the two first rods 121a and 121b are kept in the retracted position and are possibly locked in the known way to prevent unwanted retraction of the landing gear. The second rods 122a and 122b are therefore prepositioned in a central position, allowing their end to move in both directions and therefore allowing the lateral extensions 11a and 11b to be moved in one direction or the other, along the longitudinal direction of the airplane.

When taxiing along the ground, the pilot sends an instruction to rotate in one direction or the other to the nose gear control system. This system then sends a deployment command to one of the second rods 122a or 122b and at the same time a retraction command of the same amplitude to the other second rod. The two lateral extensions move by equal lengths and in opposite directions and so the tee 9 is made to turn about its axis. It therefore, via the torque link 8, causes the hub of the wheels to move through an angle equal to the angle it has experienced, thus orienting the wheels for taxiing along the ground.

Conversely, when the pilot commands retraction of the landing gear the control system unlocks the secondary leg bracing strut 5 and sends a command to the second rods 122a and 122b to make them adopt the same elongation, thus positioning the wheels along the axis of the airplane. Once this alignment has been achieved, the system orders deployment of the first rods 121a and 121b symmetrically, and this pushes on the lateral extensions 11a and 11b and causes the leg 1 to be raised and retracts the nose gear into the fuselage.

Although the invention has been described in conjunction with one particular embodiment, it is quite clear that it encompasses all technical equivalents of the means described and combinations thereof where these fall within the scope of the invention.

The invention claimed is:

1. An aircraft landing gear comprising:
   a leg comprising two arms forming a pivot for retracting the landing gear;
   a rotary tube mounted so that it can turn inside the leg about a pivot axis and extending beyond the retraction pivot with respect to a position of at least one wheel of the landing gear;
   a sliding rod capable of translational movement inside the rotary tube along the pivot axis and bearing at one of its ends the at least one wheel of the landing gear; and
   at least one means for rotating the leg about the retraction pivot through collaboration with the structure of the aircraft and with a fulcrum positioned on one of the elements of the landing gear distant from the retracting pivot,
   wherein the fulcrum is positioned on the rotary tube, on the opposite side of the retraction pivot to the at least one wheel, and the fulcrum comprises two lateral extensions positioned one on each side of the pivot axis of the rotary tube and two actuators acting respectively on the lateral extensions, the landing gear being retracted or lowered by simultaneously elongating moving assemblies of the two actuators by a same amplitude and the landing gear being pivoted by elongating the moving assemblies in opposite directions but by the same amplitude.

2. The landing gear as claimed in claim 1, wherein the fulcrum is positioned a distance from the pivot axis so as to allow the rotary tube to be rotated about its pivot axis by the means for rotating the leg.

3. The landing gear as claimed in claim 1, wherein the lateral extensions form a tee fixed to the upper end of the rotary tube by fasteners.

4. The landing gear as claimed in claim 1, wherein the actuators respectively comprise a first moving assembly defining a first elongation of the actuators and a second moving assembly defining a second elongation of the actuators, the two moving assemblies being positioned on the axis of one another and acting in series to define overall elongation of the actuators.

5. The landing gear as claimed in claim 4, wherein the actuators are hydraulic actuating cylinders comprising a first and a second pressure chamber respectively actuating the first and second moving assemblies, the first moving assembly carrying the second pressure chamber.

6. The landing gear as claimed in claim 1, wherein the landing gear further comprises a first device capable of blocking the rotation of the rotary tube about the pivot axis to allow the landing gear to be retracted and a second device capable of blocking the rotation of the leg about its retraction pivot to allow taxiing on the ground.

7. An aircraft comprising a landing gear as claimed in claim 1.

\* \* \* \* \*